United States Patent [19]

Leeming

[11] 3,769,166
[45] Oct. 30, 1973

[54] ENZYMATIC MONOHYDROLYSIS OF PROSTAGLANDIN DIESTER

[75] Inventor: Michael R. G. Leeming, Canterbury, England

[73] Assignee: American Home Products Corporation, New York, N.Y.

[22] Filed: Dec. 28, 1971

[21] Appl. No.: 213,187

[52] U.S. Cl. .................................. 195/51 R, 195/30
[51] Int. Cl. ............................................. C12d 1/02
[58] Field of Search .................... 195/2 P, 30, 36 C, 195/51

[56] References Cited
UNITED STATES PATENTS
3,687,811    8/1972    Colton et al. ......................... 195/30

FOREIGN PATENTS OR APPLICATIONS
111,971    8/1962    Pakistan

OTHER PUBLICATIONS
Jeffery et al., Biochem J. Vol. 81, p. 591–596, 1961.

Primary Examiner—Alvin E. Tanenholtz
Attorney—Vito Victor Bellino et al.

[57] ABSTRACT

The use of citrus acetyl esterase to selectively hydrolyze one of the ester functions present in 15-(R)-acetoxy-9-oxoprosta-5-cis-10,13-trans-trienoic acid, methyl ester (15-epi-PGA$_2$, acetate, methyl ester) is disclosed. The product of this selective hydrolysis is a useful intermediate for the synthesis of other physiologically active Prostaglandins.

5 Claims, No Drawings

ENZYMATIC MONOHYDROLYSIS OF PROSTAGLANDIN DIESTER

BACKGROUND OF THE INVENTION

Many of the class of chemical compounds known as Prostaglandins have been found to have pharmacologic activity, for example they are useful as smooth muscle relaxants, hypotensive agents, and smooth muscle constrictors.

One of the more important Prostaglandins is Prostaglandin $E_2$, methyl ester (abbreviated as $PGE_2$, methyl ester):

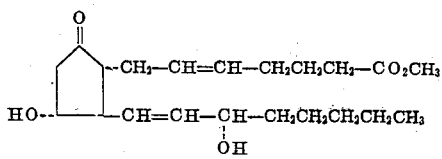

A major source of $PGE_2$ is isolation from mammalian tissue, a costly and inefficient means of obtaining this sought after material. It would thus be desirable to have another source for this material; this additional source would, ideally, be non-mammalian in origin.

The gorgonian coral *Plexaura Homomalla* (Esper) has been shown to contain a material which is useful as an intermediate for $PGE_2$, methyl ester. Thus the 15 epimeric Prostaglandin $A_2$, methyl ester (15-epi-$PGA_2$, methyl ester):

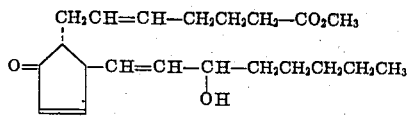

may be converted to $PGE_2$, methyl ester by the method of G. Bundy, F. Lincoln, N. Nelson, J. Pike, and W. Schneider, Annals. N. Y. Acad. Sci., 180, 76 (1971). In that procedure, the necessary intermediate, 15-epi-$PGA_2$, methyl ester, is prepared by esterification of the carboxyl group of 15-epi-$PGA_2$ which is isolated from *Plexaura Homomalla* (Esper) as a minor product. The diester, 15-epi-$PGA_2$, acetate, methyl ester which is isolated from *Plexaura Homomalla* (Esper) in amounts greater than 600% those of 15-eip-$PGA_2$ is not utilized in this sequence. It is thus the object of this invention to conveniently provide large quantities of 15-epi-$PGA_2$, methyl ester, the required intermediate for the synthesis of $PGE_2$, methyl ester, from 15-epi-$PGA_2$ acetate, methyl ester.

SUMMARY OF THE INVENTION

The invention sought to be patented resides in the concept of a process for preparing 15-(R)-hydroxy-9-oxoprosta-5-cis-10,13-trienoic acid methyl ester which comprises contacting 15-(R)-acetoxy-9-oxoprosta-5-cis-10,13-trans-trienoic acid methyl ester with citrus acetyl esterase.

According to the invention, therefore, the compound

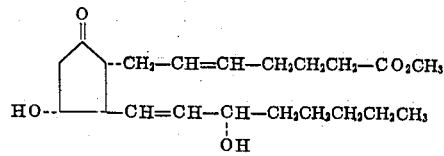

also known as 15-epi-Prostoglandin-$A_2$, methyl ester, or 15-epi-$PGA_2$, methyl ester is provided. Examination of this compound produced according to the hereinafter described process reveals upon infrared, ultraviolet, proton magnetic, and mass spectrographic analysis, spectral data which fully supports the molecular structure as hereinbefore set forth.

The product of the process of the invention possesses the inherent use characteristic of being an intermediate in the synthesis of other Prostaglandin molecules, especially $PGE_2$, methyl ester.

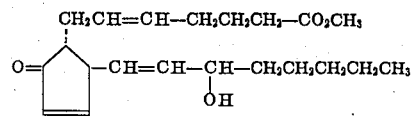

DESCRIPTION OF THE PREFERRED EMBODIMENTS

According to the process of the present invention, it has now been found possible to selectively hydrolyze the ester function at the 15 position of 15-(R)-acetoxy-9-oxoprosta-5-cis-10,13-trans-trienoic acid methyl ester (15-epi-$PGA_2$, acetate, methyl ester) without concurrent hydrolysis of the methyl ester at the 1 position. This selective hydrolysis is accomplished by use of citrus acetyl esterase, which may be prepared by the method of E. F. Jansen, R. Jang, and L. R. MacDonnell, Arch. Biochem., 15, 415 (1947). (The use of citrus acetyl esterase in cephalosporin chemistry has been described in U.S. Pat. No. 3,102,656.)

According to the process of the present invention, the 15-(R)-acetoxy-9-oxoprosta-5-cis-10,13-trans-trienoic acid, methyl ester (15-epi-$PGA_2$, acetate, methyl ester) is contacted with citrus acetyl esterase in aqueous medium for from about 5 to about 60 hours preferably at about room temperature. The temperature is not critical, but should be kept below about 60° to avoid inactivation of the esterase. The pH of the aqueous medium may vary from about 5.5 to 7.5 but is ideally maintained at 6.5 throughout the reaction period. In addition, the 15-epi-$PGA_2$, acetate, methyl ester may be adsorbed on a finely divided, inert substrate such as Celite prior to its contact with the citrus acetyl esterase, or the 15-epi-$PGA_2$, acetate, methyl ester, may be conveniently emulsified in an aqueous medium as for example by use of an ultrasonic vibrator prior to its contact with citrus acetyl esterase. It will be obvious to one skilled in the art of organic chemistry that the hydrolysed product, 15-epi-$PGA_2$, methyl ester, may be collected by any of several procedures as for example by extraction of the aqueous medium with a water imiscible organic solvent such as ether or chloroform. Drying and evaporation of the solvent followed by purification of the product, for example by chromatographic means, yields a material whose infrared, ultraviolet, proton magnetic and mass spectra are in full agreement with the structure 15-epi-$PGA_2$, methyl ester.

The 15-epi-$PGA_2$, methyl ester so obtained may then be converted to the pharmacologically useful compound, PGE$_2$, methyl ester according to the method described in Bundy et al, supra.

The best mode contemplated by the inventor of carrying out his invention will now be set forth in the following non-limiting examples:

EXAMPLE I 15-(R)Hydroxy-9-oxoprosta-5-cis-10,13-trans-trienoic acid, methyl ester (15-epi-PGA$_2$, methyl ester)

An emulsion of 15-(R)-acetoxy-9-oxoprosta-5-cis-10,13-trans-trienoic acid methyl ester (15-epi-PGA$_2$ acetate methyl ester) (100 mg.) in water (100 ml.) at 5°C was prepared using an ultrasonic vibrator. This was treated with a solution of citrus acetyl esterase (20 ml.) prepared according to E. F. Jansen, R. Jang, and L. R. MacDonnell, Arch. Biochem. 15, 415 (1947). The pH of the enzyme solution had previously been adjusted to 6.5. The reaction mixture was then shaken at 30°C under nitrogen for 17 hours, allowed to stand at room temperature for 7 hours then shaken at 30° for a further 17 hours. The mixture was then extracted with ether (5 × 50 ml.) and the extracts were washed with brine then dried over magnesium sulfate. Filtration and evaporation in vacuo gave a yellow oil (96 mg.).

EXAMPLE II 15-(R)-Hydroxy-9-oxoprosta-5-cis-10,13-trans-trienoic acid, methyl ester (15-epi-PGA$_2$, methyl ester)

15-(R)-Acetoxy-9-oxoprosta-5-cis-10,13-trans-trienoic acid, methyl ester (15-epi-PGA$_2$ acetate methyl ester) (107 mg.) in ether (20 ml.) was treated with Celite (5 g.) and the solvent was removed in vacuo <20°C. The resulting solid in water (100 ml.) was treated with citrus acetyl esterase solution which had previously been adjusted to pH 6.5. The mixture was shaken at 30°C for 17 hours then was allowed to stand at room temperature for 24 hours. It was then filtered and the filter cake was washed well with ether. The filtrate was then extracted with ether (5 × 50 ml.) and the combined filtrate and extracts were washed with brine and dried over magnesium sulfate. Filtration and evaporation in vacuo gave an oil (76 mg.).

EXAMPLE III

The products of examples I and II were identical by TLC (silica gel, ethyl acetate-benzene) and they were therefore combined and chromatographed over silica gel (7g.), using a gradient of ethyl acetate in benzene. Two major fractions were obtained. 15-Epi-PGA$_2$ acetate methyl ester (43 mg.) and a more polar compound (50 mg.). This more polar compound was shown to be 15-(R)-hydroxy-9-oxoprosta-5-cis-10,13-trans-trienoic acid, methyl ester (15-epi-PGA$_2$, methyl ester) $\nu_{max}$ 3470, 1745, 1710, 1590 cm.$^{-1}$ $\lambda_{max}$ 216 m$\mu$ shifting to 278 m$\mu$ on base treatment. The NMR and mass spectra were also in full agreement with this structure.

The subject matter which the applicant regards as his invention is particularly pointed out and distinctly claimed as follows:

1. A process for preparing 15-(R)-hydroxy-9-oxoprosta-5-cis-10,13-trans-trienoic acid methyl ester which comprises contacting 15-(R)-acetoxy-9-oxoprosta-5-cis-10,13-trans-trienoic acid methyl ester with citrus acetyl esterase.

2. The process as in claim 1 wherein the 15-(R)-acetoxy-9-oxoprosta-5-cis-10,13-trans-trienoic acid is contacted with citrus acetyl esterase in aqueous medium at a pH from 5.5 to 7.5.

3. The process as in claim 1 wherein the 15-(R)-acetoxy-9-oxoprosta-5-cis-10,13-trans-trienoic acid methyl ester is contacted with citrus acetyl esterase in aqueous medium at a pH of 6.5.

4. The process as in claim 1 wherein the 15-(R)-acetoxy-9-oxoprosta-5-cis-10,13-trans-trienoic acid methyl ester is adsorbed on a finely divided inert substrate prior to its contact with citrus acetyl esterase.

5. The process as in claim 1 wherein the 15-(R)-acetoxy-9-oxoprosta-5-cis-10,13-trans-trienoic acid methyl ester is emulsified in an aqueous medium prior to its contact with citrus acetyl esterase.

* * * * *